United States Patent [19]
Robelen

[11] Patent Number: 5,559,923
[45] Date of Patent: Sep. 24, 1996

[54] VAPOR GENERATOR WAND

[75] Inventor: David B. Robelen, Yorktown, Va.

[73] Assignee: The United States of America as represented by the Administrator of the National Aeronautics and Space Administration, Washington, D.C.

[21] Appl. No.: 359,320

[22] Filed: Nov. 28, 1994

[51] Int. Cl.⁶ .................................................... F22B 29/06
[52] U.S. Cl. ............................................ 392/397; 392/398
[58] Field of Search .................................. 392/397, 404, 392/406, 471, 480, 398, 396, 479, 485, 488, 490

[56] References Cited

U.S. PATENT DOCUMENTS

| | | |
|---|---|---|
| 3,234,357 | 2/1966 | Seuthe ...................................... 392/397 |
| 3,964,304 | 6/1976 | Parrish . |
| 4,493,211 | 1/1985 | Weinstein . |
| 4,764,660 | 8/1988 | Swiatosz ................................. 392/397 |
| 5,353,370 | 10/1994 | Kim et al. ............................... 392/485 |

Primary Examiner—Teresa J. Walberg
Assistant Examiner—Sam Paik
Attorney, Agent, or Firm—Kimberly A. Chasteen

[57] ABSTRACT

A device for producing a stream of vapor for wind tunnel airflow visualization is described. An electrically conductive heating tube is used to resistively heat a vapor producing liquid. The heating and delivery systems are integrated to allow the device to present a small cross section to the air flow, thereby reducing disturbances due to the device. The simplicity of the design allows for inexpensive implementation and construction. The design is readily scaled for use in various wind tunnel applications. The device may also find uses in manufacturing, producing a vapor for deposition on a substrate.

4 Claims, 3 Drawing Sheets

VAPOR GENERATOR WAND

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

The invention relates to the field of vapor production and distribution. It may find more specific use in the field of wind tunnel flow visualization.

2. Description of the Related Art

Applications for vapor production can be found in a variety of fields. In theater settings vapor may be produced as a visual special effect. For training exercises vapor production may serve to simulate a fire. Yet another use is in wind tunnel airflow visualization.

In wind tunnel airflow visualization, a model is placed in a low speed wind tunnel, an airflow is provided and the interaction between the airflow and the model is observed. In order to render visible the motions of the air the experimenter provides what is known as a smoke plume, in practice this is not usually smoke but rather a vapor created by heating an oil or other substance until a vapor is produced. The resulting vapor is not the product of combustion so is not properly called a smoke. The plume of vapor, when properly illuminated provides the experimenter with a visible indication of direction of airflow in a given region.

It is desirable to be able to provide the vapor without disturbing the natural airflow of the observed system. It is also often desirable to be able to move the source of vapor to various points in the wind tunnel so that airflows around different portions of the model may be observed.

The currently available selection of vapor producing devices does not meet the needs of the airflow visualization community. These devices tend to be bulky, having a heater, liquid reservoir, and controlling electronics contained in one device. In general, they produce a low density smoke stream. They may be unsuitable for use in airflow visualization due to the downwind effects produced by airflow around the generator itself. While these effects may be diminished by careful selection of test geometry, that step will necessarily reduce the tester's ability to move the vapor source.

Parrish (U.S. Pat. No. 3,964,304) discloses a compact smoke generator for use in airflow visualization. This device makes use of a heating element with the fluid heated in a coil wrapped around the heating element.

Weinstein (U.S. Pat. No. 4,493,211) discloses a smoke generator that makes use of a heating tube that is closed on one end and has an output hole drilled through a portion of the heating tube's sidewall. Weinstein specifically addresses the problem of producing a compact generator that is capable of producing laminar flow.

Each of these devices is capable of producing a vapor that may be used for airflow visualization. Each is more compact than prior art devices, however both must still be employed at a distance from the area of interest in testing because they still have somewhat bulky bodies.

It is an object, therefore, of the present invention to provide a vapor generating device that causes minimal interference with airflow in the region surrounding the device.

It is a further object of the present invention to provide a device that may be easily relocated within a wind tunnel.

Another object of the present invention is to provide a device that is easily scalable so that it may be employed in a wide range of wind tunnel situations.

SUMMARY OF THE INVENTION

These objects and others are accomplished by providing a wand device that incorporates the heating process into the output portion of the device. A tube is provided that has resistive heating properties. This tube is fed with a vapor producing fluid that is under pressure. An electrical current is passed through the tube, causing it to heat up. The fluid boils and produces a vapor which proceeds to pass through the end of the tube.

The portion of the device that needs to be placed in the wind tunnel airflow thus consists only of the tube which itself acts as a heater and a vapor output portion. This tube does not have a large adverse effect on airflow in its immediate region. It is clear that the tube may be easily relocated at various points of interest around a test specimen.

It can be easily seen that by changing the size of the tube the device may be scaled for various applications.

DESCRIPTION OF THE PREFERRED EMBODIMENTS

Figure 1A:
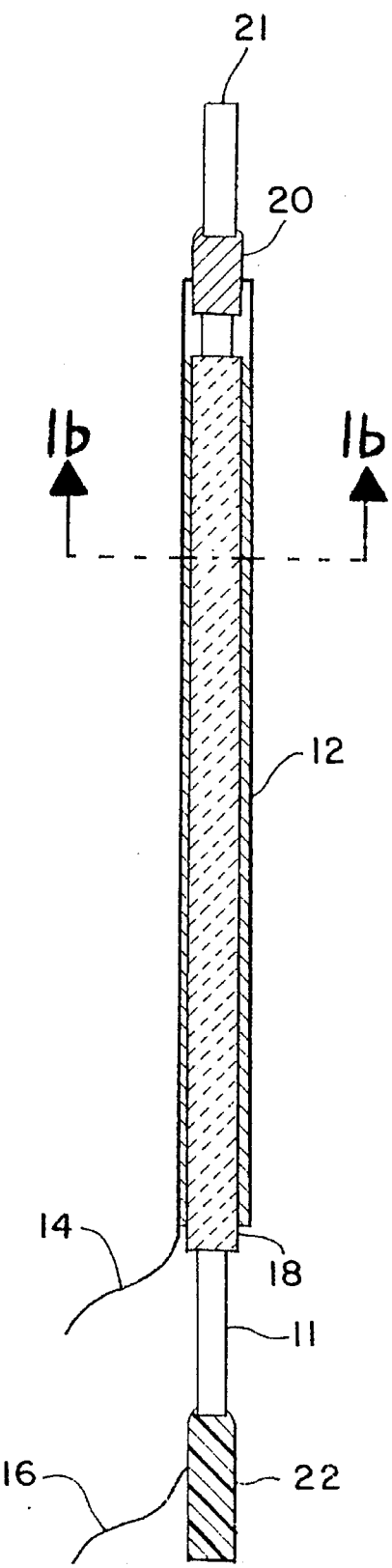
FIG. 1a is a schematic of the heating and delivery portion of the vapor generator wand.
Figure 1B:
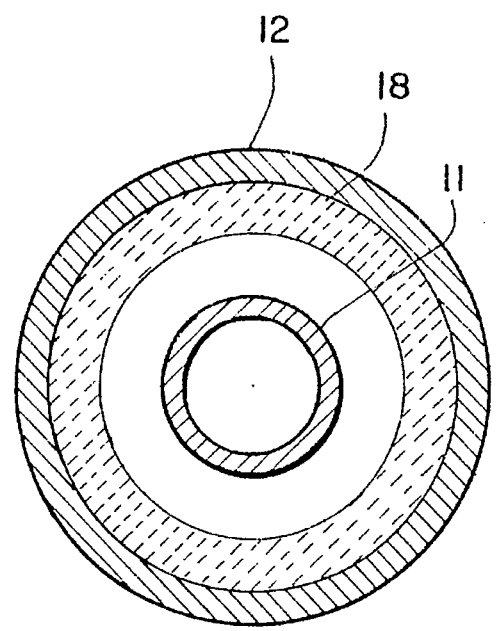
FIG. 1b is a cross section of FIG. 1a taken across line 1b—1b of FIG. 1b.
Figure 2:
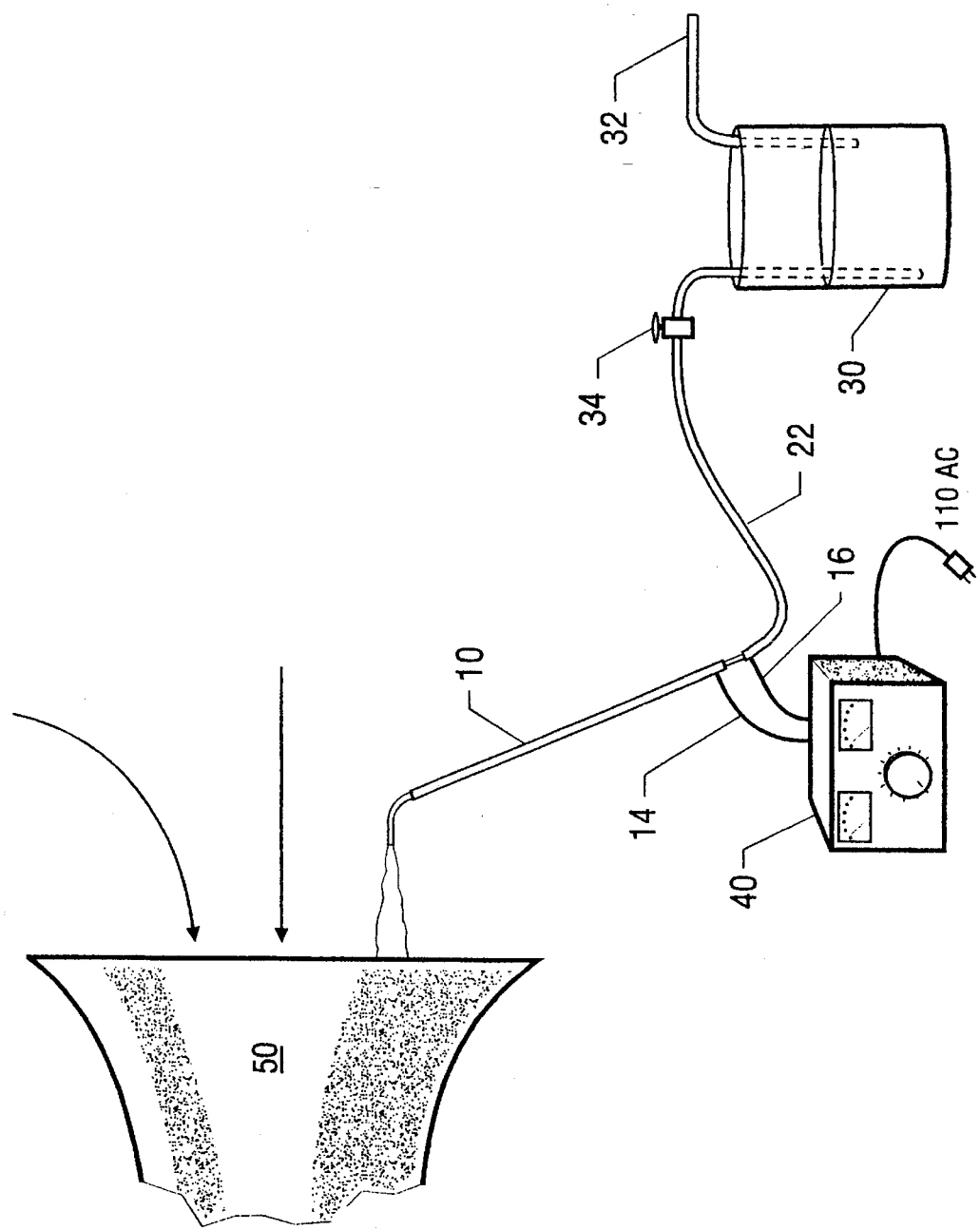
FIG. 2 is a drawing of a sample set up for employing the vapor generator wand in a demonstration wind tunnel.
Figure 3:
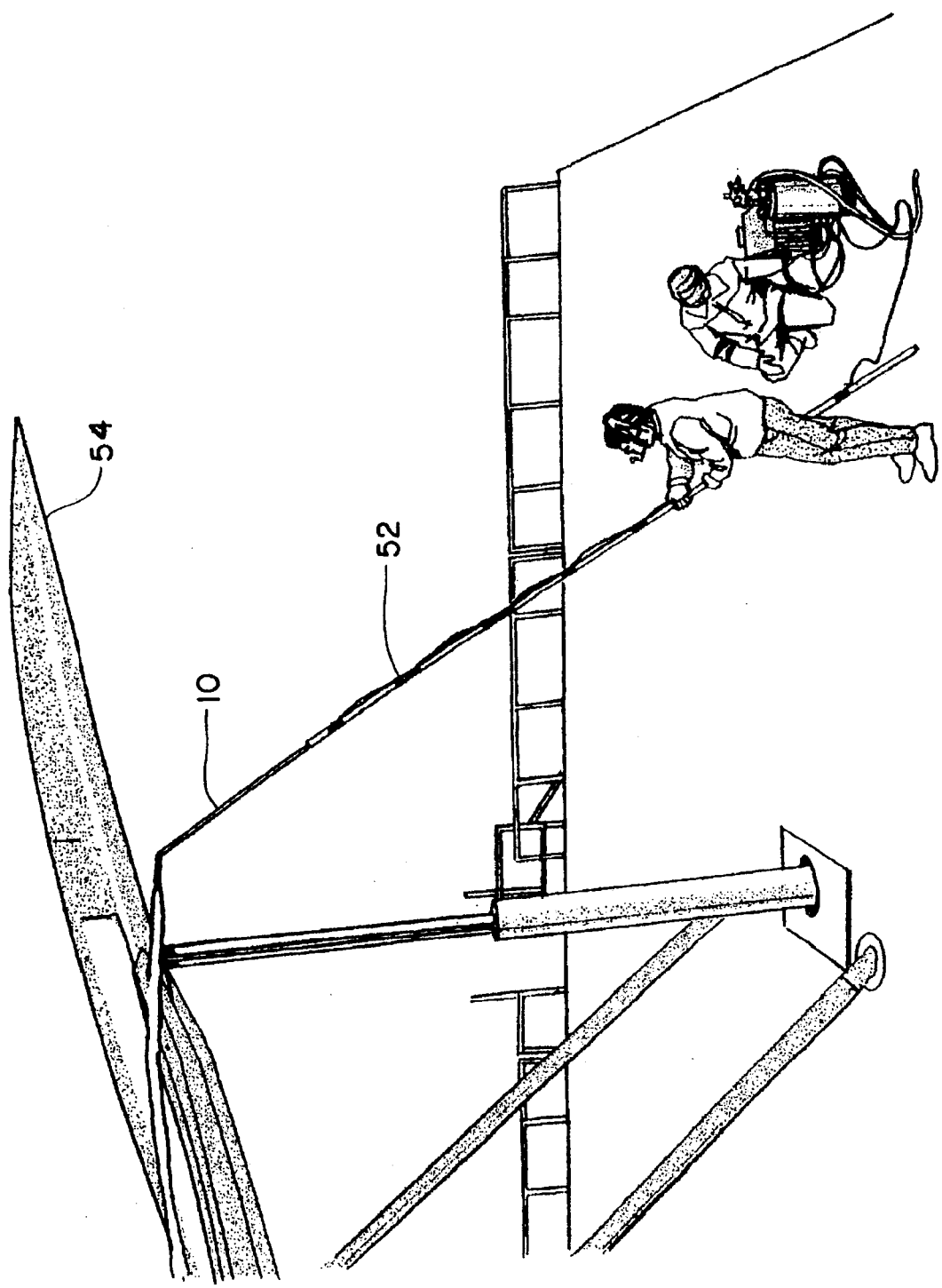
FIG. 3 is a drawing prepared from a photograph of the vapor generator wand in use in a wind tunnel.

Examples of the practice of the present invention follow, making reference to FIGS. 1a, 2 and 3 above.

In FIG. 1a is shown the detailed construction of the heating and delivery portion of the present invention. A thin stainless steel tube 11 acts as the heating portion of the vapor generator wand 10. A brass tube 12 forms the return portion of the electrical circuit. Copper wire leads 14, 16 are provided at the base of each tube. The leads are connected to a variable power supply 40 (not shown in FIG. 1a). The brass tube 12 is of larger diameter than the stainless steel tube 11 and is coaxial. The annular space between the brass and stainless steel tubes is thermally and electrically insulated with a fiberglass layer 18. Near the output end 21 of the stainless steel tube 11, the brass tube 12 is electrically connected to the stainless steel tube 11 with a brass adaptor plug 20. All joints are connected with a silver solder and the brass tubing is annealed prior to assembly. The input end of the wand is connected to a supply of fluid with plastic tubing 22.

Making reference to FIG. 2, the fluid tank 30 is kept under pressure of about 5–15 psi by an air source 32. Plastic tubing 22 leads out of the fluid tank 30 to the base of the vapor generator wand 10. Flow through this tubing is controlled by a needle valve 34.

An adjustable power supply 40 provides electrical current through the thin stainless steel tube 11. To provide the necessary heating in the stainless steel tube it is desirable to utilize a high amperage current. To reduce the risk of shock to an operator a low voltage is employed.

The fluid flows under pressure through the plastic tubing 22 into the stainless steel tubing 11 where it is heated to boiling. The boiling fluid produces a vapor which escapes through the output end 21 of the stainless steel tube 11. The vapor then enters the wind tunnel inlet 50.

As an example of the power considerations in implementing the present invention one can examine an exemplar embodiment as illustrated in FIG. 1a. The stainless steel tubing 11 is 0.020" in outside diameter with 0.005" wall thickness and is 10" long. A fiberglass insulating layer 18 having outside diameter of 0.120" is provided. The return portion of the circuit is a 9" long brass tube 12 having an outside diameter of 5/32". For this configuration, using propylene glycol as the vapor producing liquid, the power requirements are 3A at 5V. As the device is scaled in size, it obviously becomes necessary to increase power to maintain the necessary temperature.

It is preferable to use propylene glycol as the vapor producing fluid, it has good vapor producing properties and is considered to be non-toxic.

An additional insulating coating may be added to the outside of the brass tubing to reduce the danger of burn to an operator.

The vapor generator wand may be constructed within a model, such that the output end of the heating tube protrudes slightly. This embodiment allows for production of vapor at a single invariant point. This may be useful when it is desirable to observe one region of an aircraft model as it is exposed to varying angles of attack.

The vapor generator wand may also be placed at the end of a long boom. This embodiment allows a technician to move the wand to various positions within the wind tunnel so that different regions of flow may be readily observed. This is shown in FIG. 3.

Making reference to FIG. 3, a boom 52, is used to place the vapor generator wand 10 near to a test object 54.

A modular system may be employed wherein a plurality of wands of various sizes may be utilized with a single power supply and fluid supply means.

The present invention may also find uses in other fields. For example it may be used in manufacturing to provide a vapor for deposition on a substrate.

Other variations and uses will be apparent to those skilled in the art. The above embodiments are not exhaustive but rather are given by way of example. It is understood that the present invention is capable of numerous modifications within the scope of the following claims.

I claim:

1. A vapor generator wand, comprising:

a fluid supply means;

a fluid capable of producing vapor when heated, the fluid being contained within the fluid supply means;

means for controlling pressure in the fluid supply means such that the fluid may be caused to move;

a power supply;

a substantially straight, electrically conducting, heating tube for heating the fluid having a fluid intake end and an opposed vapor output end, the fluid intake end being connected with the fluid supply means;

the power supply being connected in a series circuit with the heating tube and providing a current through the heating tube, causing the tube to heat up through electrical resistance heating; and an electrically conductive outer tube, coaxial to the heating tube, the outer tube electrically connected to the heating tube so as to form a return portion of the series circuit.

2. A vapor generator wand as recited in claim 1, further comprising:

an insulator, the insulator positioned coaxially to and between the heating tube and the outer tube.

3. A vapor generator wand as recited in claim 1, further comprising a boom having at least one end, wherein the wand is positioned at the end of the boom.

4. A modular vapor generator wand system, comprising:

a fluid supply means;

a fluid capable of producing vapor when heated, the fluid being contained within the fluid supply means;

means for controlling pressure in the fluid supply means such that the fluid may be caused to move;

a power supply;

a plurality of substantially straight, electrically conducting, heating tubes for heating the fluid, each heating tube being of a different configuration, each heating tube having a fluid intake end and an opposed vapor output end;

a selected (one of the) heating tube(s), chosen from the plurality of substantially straight, electrically conducting, heating tubes, of a proper configuration being removably connected to the fluid supply means;

the power supply being removably connected in a series circuit with the selected heating tube (connected heating tube) and providing a current through the heating tube, causing the tube to heat up through electrical resistance heating; and an electrically conductive outer tube, coaxial to the heating tube, the outer tube electrically connected to the heating tube so as to form a return portion of the series circuit.

* * * * *